United States Patent Office 3,739,026
Patented June 12, 1973

3,739,026
REDUCTIVE ALKYLATION REACTIONS USING MODIFIED NICKEL CATALYST SYSTEMS
Farris H. Wilson, Jr., Cuyahoga Falls, Ohio, assignor to The Goodyear Tire & Rubber Company, Akron Ohio
No Drawing. Continuation of application Ser. No. 606,010, Dec. 30, 1966. This application Dec. 3, 1969, Ser. No. 876,174
Int. Cl. C07f 85/08
U.S. Cl. 260—576                 9 Claims

ABSTRACT OF THE DISCLOSURE

N-alkyl substituted amines are produced by reacting amine compounds, nitro compounds or nitroso compounds with an aldehyde or a ketone in the presence of hydrogen and a catalytic amount of a two component or a three component catalyst system, the former comprising a nickel catalyst and an acid, and the latter comprising a nickel catalyst, an acid and sulfur-containing compounds.

---

This is a continuation of application Ser. No. 606,010, filed Dec. 30, 1966.

This invention relates to new and highly effective catalytic systems and to processes in which they may be used. More particularly the invention relates to improved catalytic systems that are useful in reductive alkylation reactions.

Reductive alkylation reactions such as take place between an amine, a nitro or a nitroso compound when reacted with an aldehyde or ketone in the presence of hydrogen are commonly employed to produce N-alkyl substituted amines. Such reductive alkylation reactions are known to be catalyzed by certain metallic catalysts. However, many of the previously known metallic catalysts that are reasonably effective in promoting reductive alkylation reactions also have a tendency to promote one or more undesirable side reactions. For example, reductive alkylation reactions employing an amine, hydrogen and an aldehyde or ketone frequently result in the reduction of a substantial portion of the aldehyde or ketone to the corresponding alcohol. Another undesirable competing reaction when the nitro, nitroso or amine employed is an aryl compound is the reduction of the aromatic ring.

U.S. Pat. No. 3,366,684, issued Jan. 30, 1968, discloses improved and highly effective catalytic systems for reductive alkylation reactions. This catalytic system comprises a nickel catalyst in combination with free sulfur or sulfur-containing compounds. The use of sulfur or sulfur-containing compounds along with the nickel alkylation catalyst is shown to increase the yields obtained in reductive alkylation reactions without promoting undesirable side reactions.

It is an object of this invention to provide other improved and highly effective catalytic systems for reductive alkylation reactions. It is a broad object of this invention to provide reductive alkylation catalytic systems which will produce high yields of the desired N-alkyl substituted amine. It is a specific object of this invention to provide a reductive alkylation catalyst that will produce a high yield of the desired N-alkyl substituted amine without promoting undesirable side reactions and in particular the reduction of the aldehyde or ketone alkylating agent to the corresponding alcohol. It is a still further object of this invention to provide an improved process for producing a high yield of N-alkyl substituted amines.

In accordance with the present invention some of the above objects are accomplished by using a two-component catalytic system while other objects are accomplished by using a three-component catalytic system to effectively reductively alkylate nitro, nitroso or amine compounds.

The two-component system comprises concentrated metallic nickel or nickel dispersed on an inert carrier material and an acid containing no sulfur (i.e., sulfur-free acids) and sulfur-containing acids in which the sulfur is in the form of a

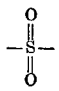

radical. The three-component system comprises the two-component system and a modifier comprising free sulfur or sulfur-containing compounds which contain at least a portion of said sulfur in the form of a —S— and/or a

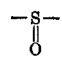

radical.

Nickel catalysts broadly may be used in accordance with the present invention to produce improved catalytic compositions. The term "nickel catalyst" as employed throughout this specification and in the accompanying claims includes the following materials:

(1) relatively pure metallic nickel that may be in finely subdivided form;
(2) metallic nickel further modified with small amounts of other metals such as cobalt, chromium and zirconium; and
(3) metallic nickel in pure form or modified with small amounts of other metals supported on an inert carrier such as kieselguhr, charcoal, clays, alumina, etc.

Examples of suitable sulfur-free acids and sulfur-containing acids in which the sulfur is in the form of a

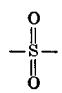

radical are sulfonic acids and organic acids and inorganic acids containing no sulfur. In the two-component system the preferred acids are sulfuric acid, toluene sulfonic acid and oxalic acid. The most preferred acid in the two-component system is sulfuric acid. The preferred acids in the three-component system are aromatic sulfonic acids, the most preferred acid being toluene sulfonic acid.

Examples of suitable sulfur-containing compounds that may be employed as catalyst modifiers in the three-component system include sulfur and:

(1) mercaptans
(2) sulfenyl thiocyanates
(3) sulfenamides
(4) sulfenic esters
(5) sulfenic anhydrides
(6) thiophosphites
(7) thiophosphates
(8) thio ortho esters
(9) alkyl thio sulfates
(10) thio sulfonic esters
(11) thio sulfinic esters
(12) thio sulfite esters
(13) hydroxy mercaptans
(14) alkoxy mercaptans
(15) cyano mercaptans
(16) aldehyde mercaptans
(17) keto mercaptans
(18) sulfide mercaptans
(19) amino mercaptans

(20) mercapto acids
(21) organic sulfides
(22) inorganic sulfides
(23) hydroxy disulfides
(24) amino disulfides
(25) aldehyde sulfides
(26) keto sulfides
(27) thio amines
(28) cyano sulfides
(29) heterocyclic compounds containing ring sulfur
(30) thiones
(31) sulfide acids
(32) disulfide acids
(33) mercaptals
(34) mercaptoles
(35) disulfides
(36) polysulfides
(37) thio acids
(38) thiol esters
(39) thion esters
(40) thio anhydrides
(41) dithio acids
(42) thio amides
(43) thiol carbonic esters
(44) thion carbonic esters
(45) dithio carbonic esters
(46) dithiol carbonic esters
(47) dithiol carbonic salts
(48) trithio carbonic esters
(49) trithio carbonic salts
(50) thiol carbamic esters
(51) thion carbamic esters
(52) dithio carbamic acid esters
(53) thiol carbazates
(54) thiuram monosulfides
(55) thiuram disulfides
(56) thiuram polysulfides
(57) thioureas
(58) isothiuronium salts
(59) thiols
(60) thio semicarbazide
(61) thio carbazone
(62) sulfur halides
(63) sulfoxides
(64) sulfide acid esters In addition to the above classes of compounds that may be effectively employed as sulfur-containing modifiers in the practice of this invention, any compounds containing a multiplicity of any of the above characteristic groupings may also be employed.

The preferred sulfur-containing modifiers include sulfur and the following classes of sulfur-containing compounds selected from the classes enumerated above.

thioureas
sulfide acids
mercapto acids
thio amides
disulfide acids
thiuram disulfides
mercaptans of heterocyclics containing ring sulfur
disulfides of heterocyclics containing ring sulfur
heterocyclics containing ring sulfur
disulfides
cyano sulfides
sulfoxides
thio acids
organic sulfides
mercaptans
dithio acids
sulfides of heterocyclics containing ring sulfur
sulfide acid esters The most preferred modifiers that may be employed in accordance with the present invention are those compounds which when employed with a nickel catalyst and an acid according to this invention produce a catalytic system that is effective in catalyzing a reductive alkylation reaction to provide at least a 95 percent yield of the desired N-alkyl substituted amine compounds. These most preferred modifiers include sulfur and the following classes of sulfur-containing compounds.

sulfide acids
thiuram disulfides
cyano sulfides
sulfoxides
organic sulfides
mercaptans of heterocyclics containing ring sulfur
sulfides of heterocyclics containing ring sulfur
heterocyclics containing ring sulfur The most highly preferred three-component catalytic system is comprised of a nickel catalyst, thiodipropionic acid and toluene sulfonic acid. The three-component system is preferred in general over the two-component system.

Any of the aldehydes and ketones that are normally employed in a conventional reductive alkylation type reaction may be employed in the practice of this invention. Typical examples of suitable aldehydes and ketones include methyl ethyl ketone, methyl isobutyl ketone, methyl isoamyl ketone, methyl hexyl ketone, butyl aldehyde and benzaldehyde.

The amine or amine precursors that are useful in carrying out reactions of the type contemplated by the present invention are any of the primary amines or amine precursors that will produce primary amines of the type normally employed in a conventional reductive alkylation reaction. Typical examples of suitable amines or amine precursors include aniline, para-nitrodiphenylamine, para-aminodiphenylamine, ortho-phenylenediamine and para-nitroso-diphenylamine.

The amount of acid to be used in the two-component and three-component systems will vary somewhat, depending upon the particular reductive alkylation reaction in which the catalyst is to be employed, the sulfur-containing modifier used to modify the catalyst (if a three-component system is used) and the acids. However, it will in general be found that from 0.005 to 0.100 gram molecular weight of the acid should be employed per 100 grams of nickel in the metallic catalyst.

The amount of sulfur-containing material that should be used to modify the nickel catalyst will also vary somewhat, depending upon the particular reductive alkylation reaction in which the catalyst is to be employed, the sulfur-containing modifier used to modify the catalyst and the acid. However, in general it has been found from about 0.05 to about 8.0 grams of contained sulfur should be employed per 100 grams of nickel in the metallic catalyst. A specific range is from 0.10 to 4.0 grams of contained sulfur per 100 grams of nickel.

The nickel catalyst/sulfur-containing modifier (if a three-component system is used) and acid may be added to the reaction mixture separately, all together or in any combination and in any order. One way, but by no means the only way, in which such a physical mixture may be conveniently prepared, is by slurrying the nickel catalyst in a solvent and adding the acid (or acid and sulfur-containing modifier) dissolved in the same solvent, mixing and then removing the solvent. The reductive alkylation reaction is normally conducted at temperatures between 50 and 240° C. Since a reductive alkylation reaction employs hydrogen it is necessary to conduct the reaction under substantial pressure. Normal pressures employed generally range from 250 to 2000 pounds per square inch, but in some cases may be substantially higher in the range of 4000 to 5000 pounds per square inch.

In order to most effectively catalyze a reductive alkylation reaction the catalytic systems of this invention are employed in an amount from 0.10 to 8 grams, based on the weight of contained nickel, per mol of primary amine in the reaction mixture.

In carrying out a reductive alkylation reaction wherein the catalytic systems of this invention are conveniently employed, the amine, nitro or nitroso compound is charged into a suitable reactor with an aldehyde or ketone that is to be employed as the alkylating agent and a catalytic system as has been described above. The aldehyde or ketone alkylating agent is normally employed in excess and acts as a solvent for the reactants and thus alleviates the necessity of other solvent diluents being employed in the reaction. Other solvent diluents such as ethyl alcohol, isopropyl alcohol, benzene and toluene may be used if the aldehyde or ketone alkylating agent is not employed in an excess amount sufficient to act as a solvent for the reactants. The mixture is heated to a reaction temperature in the range of between 50 and 240° C. and hydrogen under pressure of from 250 to 2000 pounds per square inch is then introduced to the reaction vessel. The reaction is permitted to proceed for a period of time sufficient to obtain conversion of the reactants to the N-alkyl substituted amine. The pressure on the reaction vessel is then released and the product is recovered by distilling off the volatile materials. The employment of the catalytic systems of this invention results in high yields of the reductively alkylated product. The employment of the three-component catalytic system of this invention enables the reaction to be conducted at comparatively high temperatures where it proceeds readily without any significant conversion of the aldehyde or ketone alkylating agent to its corresponding alcohol. Reductive alkylation reactions of the type described may be carried out on either a batch or continuous basis.

The preparation of the catalytic systems of this invention and their use in reductive alkylation reactions are illustrated by the following examples, which should be considered representative rather than restrictive of the scope of the invention.

Example 1 is a control reaction using only a nickel catalyst. Examples 2 through 13 illustrate reactions using the two-component system.

EXAMPLE 1

Into a one liter autoclave equipped with a stirrer were charged 138 grams of distilled para-aminodiphenylamine, 300 grams of methyl isobutyl ketone and two grams of a 63 percent nickel-on-kieselguhr catalyst. The mixture was reacted for four hours at 165° C. under hydrogen at 750 to 1000 pounds per square inch pressure. The resulting product was then removed from the autoclave and filtered. It was then distilled to 200° C. pot temperature at 15 to 25 millimeters of mercury. Analysis of volatiles and product was conducted by gas chromatography. The volatiles showed 10.0 percent of the original ketones charged had been reduced to the corresponding alcohol. Analysis of the product showed a 75.5 percent yield of N-4-methyl-2-pentyl-N'-phenyl-para-phenylenediamine.

Examples 2 to 13 were run in the same manner as Example 1 with the exception that various acids were used in combination with the nickel catalyst.

EXAMPLES 2 TO 13

| Ex. No. | Acid | Grams acid per gram catalyst | Solution | Percent yield | Percent of ketone reduced to alcohol |
|---|---|---|---|---|---|
| 2 | Acetic | 0.0088 | Ethanol [1] | 77.3 | 10.9 |
| 3 | do | 0.0175 | do [1] | 78.5 | 11.1 |
| 4 | do | 0.0350 | do [1] | 81.1 | 11.5 |
| 5 | Oxalic | 0.0065 | Water | 81.2 | 7.7 |
| 6 | do | 0.0130 | do | 88.9 | 5.2 |
| 7 | do | 0.0260 | do | 89.7 | 4.5 |
| 8 | Toluene sulfonic | 0.0115 | Ethanol [1] | 90.2 | 4.7 |
| 9 | do | 0.0229 | do [1] | 85.1 | 6.3 |
| 10 | do | 0.0458 | do [1] | 89.0 | 5.6 |
| 11 | Sulfuric | 0.0070 | Water | 90.3 | 3.1 |
| 12 | do | 0.0140 | do | 91.8 | 2.8 |
| 13 | do | 0.0280 | do | 87.5 | 1.8 |

[1] Indicates absolute ethyl alcohol in the above table and in any subsequent table in the specification.

The above data indicate that the presence of an acid improved the percent yield in each case. The oxalic acid, toluene sulfonic acid and sulfuric acid in addition reduced the amount of ketone that was reduced to the alcohol. This was particularly true where sulfuric acid was used.

Example 14 is a control reaction using only a nickel catalyst. Examples 15 through 66 were run in the same manner as Example 14 with the exception that the odd numbered examples were run using various sulfur-containing compounds in combination with the nickel catalyst while the even numbered examples were run using both sulfur-containing compounds and acids in combination with the nickel catalyst. The odd numbered Examples 15 through 65 illustrate reactions using two-component systems disclosed in U.S. Pat. No. 3,366,684 issued Jan. 30, 1968. The even numbered Examples 16 through 66 illustrate reactions using three-component catalyst systems within the practice of the present invention.

EXAMPLE 14

Into a one liter autoclave equipped with stirrer were charged 138 grams of distilled para-amino diphenylamine, 300 grams of methyl isobutyl ketone and two grams of a 63 percent nickel-on-kieselguhr catalyst. This reaction was run for four hours at 165° C. under hydrogen at 750 to 1000 pounds per square inch pressure. The resulting product was then removed from the autoclave and filtered. It was then distilled to 205° C. pot temperature at 20 millimeters of mercury. Analysis of volatiles and product was conducted by gas chromatography. The volatiles showed 26.6 percent of the original ketones charged had been reduced to the corresponding alcohol. Analysis of the product showed a 57.8 percent yield of N-4-methyl-2-pentyl-N'-phenyl-para-phenylenediamine.

EXAMPLES 15 THROUGH 66

Combinations of 63 percent nickel-on-kieselguhr catalyst and various sulfur-containing modifiers were evaluated in the production of N-4-methyl-2-pentyl-N'-phenyl-para-phenylenediamine both in the absence and in the presence of an acid, toluene sulfonic acid, using the same concentration of reactants and nickel catalyst and the same reaction conditions as described in Example 14. The sulfur-containing modifiers were added to the reaction mixture either as a solution or as a solid as indicated in column 2 of the following table wherein the effectiveness of various catalyst systems is summarized. The toluene sulfonic acid was added in absolute ethanol.

| Ex. No. | Sulfur-containing modifier | Solid or solution | Grams modifier per gram catalyst | Grams sulfur per gram catalyst | Grams toluene sulfonic acid per gram catalyst | Melting point, °C. | Percent yield [1] |
|---|---|---|---|---|---|---|---|
| 15 | Thiodipropionic acid | Ethanol | 0.0258 | 0.0047 | | 35–44 | 81.7 |
| 16 | do | do | 0.0258 | 0.0047 | 0.0229 | 48–51 | 100 |
| 17 | Xylene monosulfide | Methanol | 0.0331 | 0.0044 | | 43–47 | 93.8 |
| 18 | do | do | 0.0331 | 0.0044 | 0.0229 | 45–48 | 100 |
| 19 | Thioanisole | do | 0.0180 | 0.0047 | | 43–48 | 93.8 |

TABLE—Continued

| Ex. No. | Sulfur-containing modifier | Solid or solution | Grams modifier per gram catalyst | Grams sulfur per gram catalyst | Acid at— Grams toluene sulfonic acid per gram catalyst | Melting point, °C. | Percent yield [1] |
|---|---|---|---|---|---|---|---|
| 20 | ----do---- | do | 0.0180 | 0.0047 | 0.0229 | 41–45 | 100 |
| 21 | Thiodipropionitrile | do | 0.0206 | 0.0047 | | 44–48 | 97.4 |
| 22 | ----do---- | do | 0.0206 | 0.0047 | 0.0229 | 47–50 | 98.8 |
| 23 | Benzothiazole | do | 0.0200 | 0.0047 | | 43–48 | 92.5 |
| 24 | ----do---- | do | 0.0200 | 0.0047 | 0.0229 | 45–50 | 98.3 |
| 25 | Mercaptobenzothiazole | Solid | 0.0240 | 0.0046 | | | 77.5 |
| 26 | ----do---- | do | 0.0240 | 0.0046 | 0.0229 | 45–49 | 97.9 |
| 27 | Di-tert.-butylsulfide | Methanol | 0.0211 | 0.0046 | | 42–48 | 97.3 |
| 28 | ----do---- | do | 0.0211 | 0.0046 | 0.0229 | 46–50 | 97.8 |
| 29 | Benzothiazole monosulfide | Solid | 0.0290 | 0.0047 | | 40–48 | 83.0 |
| 30 | ----do---- | do | 0.0290 | 0.0047 | 0.0229 | 44–48 | 97.0 |
| 31 | S-alkyl(C-6) mercapto propionic acid | Methanol | 0.0284 | 0.0048 | | 44–48 | 94.5 |
| 32 | ----do---- | do | 0.0284 | 0.0048 | 0.0229 | 44–49 | 96.7 |
| 33 | Dimethyl sulfoxide | Benzene | 0.0113 | 0.0046 | | 46–50 | 94.1 |
| 34 | ----do---- | do | 0.0113 | 0.0046 | 0.0229 | 47–50 | 96.6 |
| 35 | Tetramethyl thiuram monosulfide | Solid | 0.0150 | 0.0034 | | | 79.0 |
| 36 | ----do---- | do | 0.0150 | 0.0034 | 0.0229 | 41–47 | 95.4 |
| 37 | Sulfur | do | 0.0138 | 0.0138 | | 42–48 | 92.4 |
| 38 | ----do---- | do | 0.0138 | 0.0138 | 0.0229 | 45–49 | 95.3 |
| 39 | Di-iso-octyl thio dipropionic acid | Ethanol | 0.0582 | 0.0046 | | 38–47 | 86.0 |
| 40 | ----do---- | do | 0.0582 | 0.0046 | 0.0229 | 42–48 | 94.9 |
| 41 | Beta-mercapto propionic acid | Methanol | 0.0154 | 0.0047 | | 40–47 | 93.5 |
| 42 | ----do---- | do | 0.0154 | 0.0047 | 0.0229 | 44–48 | 94.8 |
| 43 | Dithiodibenzoic acid | Solid | 0.0410 | 0.0043 | | | 91.1 |
| 44 | ----do---- | do | 0.0410 | 0.0043 | 0.0229 | 47–50 | 94.5 |
| 45 | Tetramethyl thiuram disulfide | do | 0.0179 | 0.0046 | | 38–46 | 89.2 |
| 46 | ----do---- | do | 0.0179 | 0.0046 | 0.0229 | 43–48 | 94.5 |
| 47 | n-Butyl sulfoxide | Methanol | 0.0234 | 0.0046 | | 35–45 | 80.7 |
| 48 | ----do---- | do | 0.0234 | 0.0046 | 0.0229 | 40–47 | 94.3 |
| 49 | Thiobenzoic acid | do | 0.0200 | 0.0046 | | 37–46 | 81.5 |
| 50 | ----do---- | do | 0.0200 | 0.0046 | 0.0229 | | 93.9 |
| 51 | Thiourea | Ethanol | 0.0110 | 0.0047 | | 38–46 | 84.3 |
| 52 | ----do---- | do | 0.0110 | 0.0047 | 0.0229 | 44–49 | 92.0 |
| 53 | Dithiobenzoic acid | Solid | 0.0410 | 0.0043 | | | 91.1 |
| 54 | ----do---- | do | 0.0410 | 0.0043 | 0.0229 | 45–49 | 91.5 |
| 55 | Thiomalic acid | Ethanol | 0.0109 | 0.0024 | | | 74.5 |
| 56 | ----do---- | do | 0.0109 | 0.0024 | 0.0229 | 40–47 | 91.0 |
| 57 | Benzothiazole disulfide | Solid | 0.0240 | 0.0047 | | | 82.4 |
| 58 | ----do---- | do | 0.0240 | 0.0047 | 0.0229 | 39–46 | 90.6 |
| 59 | 4-methyl-thiophenol | Methanol | 0.0178 | 0.0046 | | 40–44 | 83.8 |
| 60 | ----do---- | do | 0.0178 | 0.0046 | 0.0229 | 40–46 | 90.5 |
| 61 | Benzyl disulfide | Solid | 0.0180 | 0.0047 | | 39–45 | 84.0 |
| 62 | ----do---- | do | 0.0180 | 0.0047 | 0.0229 | 41–46 | 88.5 |
| 63 | Morpholine disulfide | do | 0.0168 | 0.0046 | | 37–45 | 83.7 |
| 64 | ----do---- | do | 0.0168 | 0.0046 | 0.0229 | 40–46 | 87.5 |
| 65 | Sodium sulfide | do | 0.0110 | 0.0045 | | | 61.4 |
| 66 | ----do---- | do | 0.0110 | 0.0045 | 0.0229 | | 74.6 |

[1] N-4-methyl-2-pentyl-N'-phenyl-para-phenylenediamine.

The yield data from the above table demonstrate that the addition of an acid to nickel catalyst/sulfur-containing modifier catalytic systems increases the percent yield in reductive alkylation reactions. The data also reveal that the melting point ranges were narrowed by using an acid, thereby indicating that the alkylation products possessed a high degree of purity.

EXAMPLES 67 THROUGH 78

The three-component catalytic system of this invention was compared with the nickel catalyst/sulfur-containing modifier catalytic system in various reductive alkylation systems other than the para-amino diphenylamine/methyl isobutyl ketone system. The same experimental conditions as described in Example 14 were used. The effectiveness of the various catalyst systems is summarized in the following table. Thiodipropionic acid dissolved in absolute ethanol was used as the sulfur-containing modifier in each case in a concentration of 0.0258 gram of sulfur-containing modifier per gram of catalyst. This resulted in a sulfur concentration of 0.0047 gram of sulfur per gram of catalyst. The toluene sulfonic acid was added in absolute ethanol, in a concentration of 0.0229 gram per gram of catalyst.

| Ex. No. | Alkylation system | Catalytic system | Melting point, °C. | Percent yield |
|---|---|---|---|---|
| 67 | 184 grams p-aminodiphenylamine and 288 grams 2-octanone | Nickel/modifier | | 100 |
| 68 | ----do---- | Nickel/modifier/acid | | 100 |
| 69 | 184 grams p-aminodiphenylamine and 288 grams methyl ethyl ketone | Nickel/modifier | 48–51 | 100 |
| 70 | ----do---- | Nickel/modifier/acid | 50–52 | 99.0 |
| 71 | ----do.[1] | Nickel/modifier | 48–51 | 98.4 |
| 72 | ----do.[1] | Nickel/modifier/acid | 49.5–51.5 | 100 |
| 73 | 93 grams aniline and 400 grams methyl isobutyl ketone | Nickel/modifier | | 46.3 |
| 74 | ----do---- | Nickel/modifier/acid | | 65.0 |
| 75 | 54 grams p-phenylenediamine and 400 grams 2-octanone | Nickel/modifier | | 88.6 |
| 76 | ----do---- | Nickel/modifier/acid | | 92.3 |
| 77 | 175 grams p-nitrodiphenylamine and 295 grams methyl ethyl ketone | Nickel/modifier | 44–48 | 94.0 |
| 78 | ----do---- | Nickel/modifier/acid | 45–58 | 96.1 |

[1] Run at 140° C.

The percent yield data in the above table reveal that the catalytic system of the present invention enhances the yield in various types of alkylation systems. Naturally in the cases where the percent yield is near theoretical it is impossible for the addition of an acid to substantially increase the percent yield. One of the advantages in using an acid in such systems is that it will allow the use of lower alkylation temperatures to obtain close to theoretical yields. Another advantage is that faster reaction rates for a given reaction temperature may be obtained. An indication of such an effect is demonstrated by the percent yield data in Examples 69, 70, 71 and 72. In the latter two examples the alkylation reaction was run at reduced temperature of 140° C. instead of 165° C. and yet close to theoretical yields were obtained.

EXAMPLES 79 THROUGH 84

Various acids were evaluated in the production of N-4- methyl-2-pentyl-N'-phenyl-para-phenylenediamine using a three-component catalytic system and the same experimental reactants and conditions as described in Example 14. Thiodipropionic acid dissolved in absolute ethanol was used as the modifier in each case in a concentration of 0.0258 gram of modifier per gram of catalyst. The acids were added in solution, the solvents being identified in column 3 of the following table. The effectiveness of the various acids is summarized in the following table.

| Ex. No. | Acid | Solvent | Grams acid per gram of catalyst | Melting point, °C. | Percent yield |
|---|---|---|---|---|---|
| 79 | | | | 38–44 | 89.3 |
| 80 | Sulfuric | Water | 0.0140 | 48–50.5 | 99.9 |
| 81 | Acetic | Ethanol | 0.0175 | 48–50.5 | 98.6 |
| 82 | Oxalic | Water | 0.0260 | 48–50.5 | 97.7 |
| 83 | Hydrochloric | do | 0.0049 | 46–48 | 95.6 |
| 84 | Oleic | Methanol | 0.0820 | 47–50 | 95.1 |

The above data demonstrate that acids other than organic sulfonic acids may be used in the practice of this invention.

EXAMPLES 85 THROUGH 88

Premodified catalytic systems were prepared by slurrying the nickel catalyst in absolute ethanol and adding the sulfur-containing modifier and acid also dissolved in absolute ethanol. The slurry was mixed well and dried in a vacuum oven. The free flowing solid premodified catalytic systems were then used in place of the normal catalytic systems using the same charge and conditions as described in Example 14 to produce N-4-methyl-2-pentyl-N'-phenyl-para-phenylenediamine. Both premodified nickel catalyst/sulfur-containing modifier and nickel catalyst/sulfur-containing modifier/acid catalytic systems were used. The effectiveness of these premodified systems is compared in the following table.

| Ex. No. | Sulfur-containing modifier | Grams modifier per gram catalyst | Grams sulfur per gram catalyst | Acid at— Grams toluene sulfonic acid per gram catalyst | Melting point, °C. | Percent yield |
|---|---|---|---|---|---|---|
| 85 | Thiodipropionic acid | 0.0258 | 0.0047 | | 46–50 | 93.9 |
| 86 | do | 0.0258 | 0.0047 | 0.0229 | 48–51 | 97.7 |
| 87 | Xylene monosulfide | 0.0331 | 0.0044 | | 46–49 | 95.8 |
| 88 | do | 0.0331 | 0.0044 | 0.0229 | 48–50 | 96.7 |

The data in the above table demonstrate that the catalytic systems of this invention are also effective when prepared as premodified catalytic systems and that the addition of an acid increases the percent yield.

In summary, the co-pending United States application Ser. No. 426,408, now U.S. Pat. No. 3,366,684, has shown that the use of sulfur-containing materials with a nickel catalyst enhances the yields in reductive alkylation reactions without promoting undesirable side reactions. The present application demonstrates that the use of various acids in combination with nickel catalysts results in an improved yield in reductive alkylation reactions and in some cases reduces undesirable side reactants. In addition, the present application has shown that the use of various sulfur-containing materials in combination with the nickel catalyst/acid system results in even greater yields than are obtained with either the nickel catalyst/sulfur-containing material or nickel catalyst/acid systems without promoting undesirable side reactions.

What is claimed is:

1. In the reductive alkylation process of producing an N-alkyl substituted amine by reacting p-aminodiphenylamine with a ketone selected from the group consisting of methyl isoamyl ketone and methyl isobutyl ketone in the presence of hydrogen, the improvement wherein the reaction is conducted in the presence of a catalytic amount of a catalytic system comprising (a) a nickel catalyst, (b) a sulfur-containing material selected from the group consisting of thiodipropionic acid and mercaptobenzothiazole, in a proportion to provide from 0.10 to 4.0 grams of contained sulfur per 100 grams of nickel and (c) from 0.005 to 0.100 gram molecular weight of toluene sulfonic acid per 100 grams of nickel.

2. The process according to claim 1 wherein the N-alkyl substituted amine is N-phenyl, N'-4-methyl-2-pentyl-para-phenylenediamine, the ketone is methyl isobutyl ketone, and the sulfur-containing material is thiodipropionic acid.

3. The process according to claim 1 wherein the N-alkyl substituted amine is N-phenyl, N'-secondary heptyl-para-phenylenediamine, the ketone is methyl isoamyl ketone, and the sulfur-containing material is thiodipropionic acid.

4. The process according to claim 1 wherein the N'-alkyl substituted amine is N-phenyl, N'-4-methyl-2-pentyl-para-phenylenediamine, the ketone is methyl isobutyl ketone, and the sulfur-containing material is mercaptobenzothiazole.

5. The process according to claim 1 wherein the N-alkyl substituted amine is N-phenyl, N'-secondary-heptyl-para-phenylenediamine, the ketone is methyl isoamyl ketone, and the sulfur-containing material is mercaptobenzothiazole.

6. In the reductive alkylation process of producing an N-alkyl substituted amine by reacting a material selected from the group consisting of amine compounds, nitro compounds and nitroso compounds with a material selected from the group consisting of aldehydes and ketones in the presence of hydrogen, the improvement wherein the reaction is conducted in the presence of a catalytic amount of a catalytic system comprising (a) a nickel catalyst and (b) at least one acid selected from the group consisting of sulfuric acid, toluene sulfonic acid, oxalic acid, acetic acid, hydrochloric acid and oleic acid.

7. The process according to claim 6 wherein the acid is selected from the group consisting of sulfuric acid, toluene sulfonic acid and oxalic acid.

8. The process according to claim 6 wherein the acid is sulfuric acid.

9. In the reductive alkylation process of producing an N-alkyl substituted amine by reacting a material selected from the group consisting of amine compounds, nitro compounds and nitroso compounds with a material selected from the group consisting of aldehydes and ketones in the presence of hydrogen, the improvement wherein the reaction is conducted in the presence of a catalytic amount of a catalytic system comprising (a) a nickel catalyst and (b) at least one sulfur-free acid.

References Cited

UNITED STATES PATENTS 3,219,704   1/1965   Wilder et al. _____ 260—576

LEWIS GOTTS, Primary Examiner

R. L. RAYMOND, Assistant Examiner

U.S. Cl. X.R.

252—430, 434, 436, 439; 260—563 D, 570.9, 583 R, 585 C